United States Patent
Mueller

(10) Patent No.: US 11,453,364 B2
(45) Date of Patent: Sep. 27, 2022

(54) ACCESS SYSTEM FOR A VEHICLE, METHOD FOR AN ACCESS SYSTEM, COMPUTER PROGRAM PRODUCT, AND COMPUTER-READABLE MEDIUM

(71) Applicant: HELLA GmbH & Co. KGaA, Lippstadt (DE)

(72) Inventor: Bernhard Mueller, Hamburg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/221,509

(22) Filed: Apr. 2, 2021

(65) Prior Publication Data

US 2021/0221329 A1     Jul. 22, 2021

Related U.S. Application Data

(63) Continuation of application No. PCT/EP2019/076178, filed on Sep. 27, 2019.

(30) Foreign Application Priority Data

Oct. 2, 2018 (DE) ...................... 10 2018 124 354.5

(51) Int. Cl.
    *B60R 25/20*     (2013.01)
(52) U.S. Cl.
    CPC ................... *B60R 25/20* (2013.01)
(58) Field of Classification Search
    CPC ....... B60R 25/20; B60R 25/24; B60R 25/305; B60R 25/25; B60R 25/2045;
(Continued)

(56) References Cited

U.S. PATENT DOCUMENTS 8,976,005 B2    3/2015    Zivkovic et al.
10,239,494 B2    3/2019    Spiess
(Continued)

FOREIGN PATENT DOCUMENTS

DE      19850176 C1    8/2000
DE      10105060 A1    8/2002
(Continued)

OTHER PUBLICATIONS

International Search Report dated Dec. 16, 2019 in corresponding application PCT/EP2019/076178.

*Primary Examiner* — Edwin C Holloway, III
(74) *Attorney, Agent, or Firm* — Muncy, Geissler, Olds & Lowe, P.C.

(57) ABSTRACT

An access system and a method for a vehicle, having at least one vehicle-mounted motion sensor and at least one motion sensor that can be carried by a person, in each case for sensing a single sequence of motions of the person moving outside of the vehicle and carrying the portable motion sensor, an access control unit of the vehicle for locking and/or unlocking at least one door of the vehicle and a controller for comparing the sequence of motions of the person sensed via the vehicle-mounted motion sensor with the sequence of motions of the person sensed via the portable motion sensor, wherein the access control unit can be actuated by the controller as a function of the comparison of the two sequences of motions in such a manner that the access control unit automatically locks or automatically unlocks the at least one door.

18 Claims, 1 Drawing Sheet

(58) Field of Classification Search
CPC ............ B60R 25/2054; G07C 9/00309; G07C 2009/00555; G07C 2209/64; G07C 2209/06; G07C 2209/65
USPC ........................................................ 340/5.72
See application file for complete search history.

(56) References Cited

U.S. PATENT DOCUMENTS

| | | | |
|---|---|---|---|
| 10,800,380 | B2 | 10/2020 | Weghaus |
| 2014/0340193 | A1* | 11/2014 | Zivkovic .................. G07C 9/28 340/5.61 |
| 2015/0116079 | A1* | 4/2015 | Mishra .................... G07C 9/257 340/5.52 |
| 2016/0075307 | A1* | 3/2016 | Jakobsson ............. B60R 25/241 701/2 |
| 2016/0140539 | A1 | 5/2016 | Ma et al. |
| 2018/0232971 | A1 | 8/2018 | Schieke et al. |
| 2019/0044951 | A1* | 2/2019 | Zivkovic ................. G06F 21/32 |

FOREIGN PATENT DOCUMENTS

| | | |
|---|---|---|
| DE | 102015109468 A1 | 12/2016 |
| DE | 102016220126 A1 | 5/2017 |
| DE | 102016210140 A1 | 12/2017 |
| DE | 102017205162 A1 | 9/2018 |
| EP | 2806406 A2 | 11/2014 |
| EP | 3335942 A1 | 6/2018 |

* cited by examiner

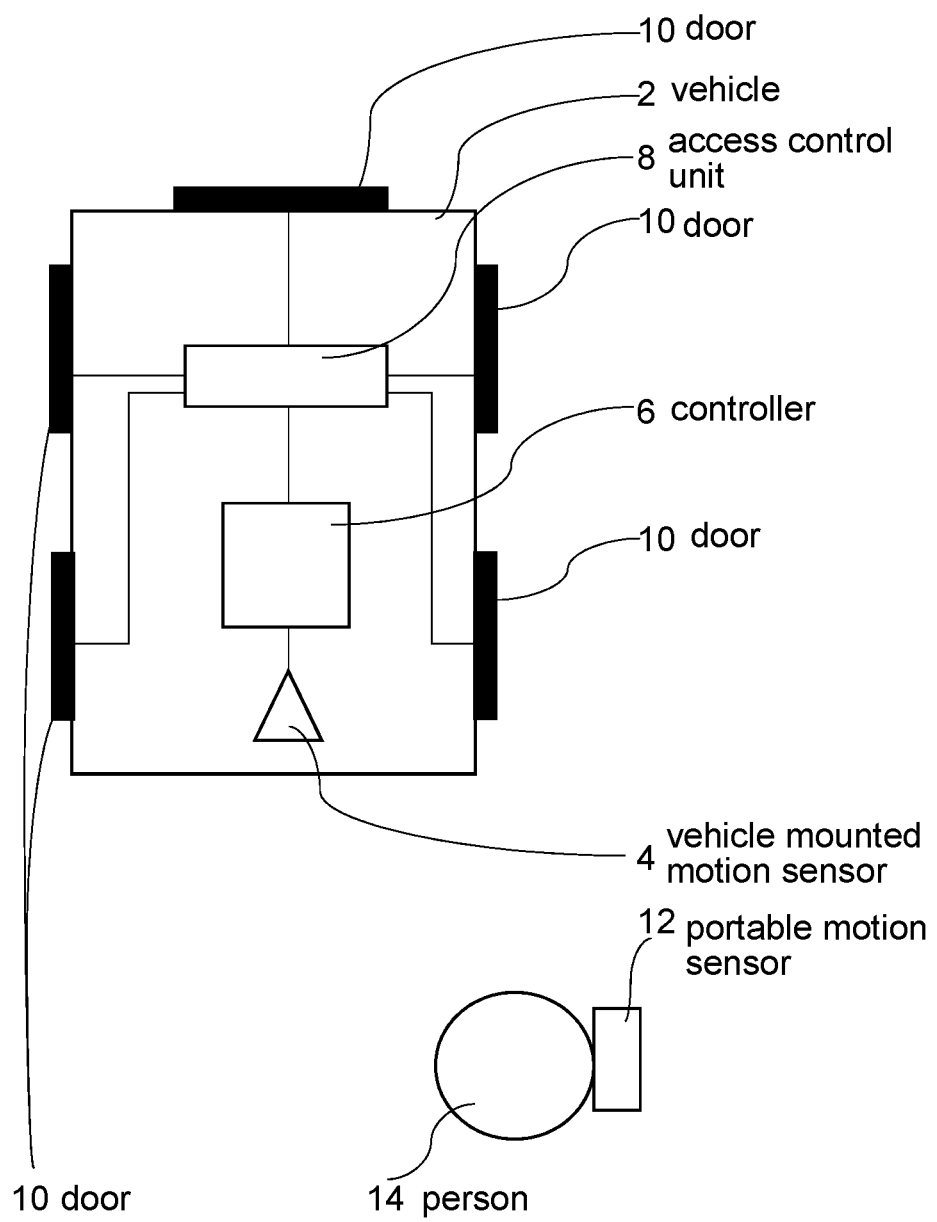

ACCESS SYSTEM FOR A VEHICLE, METHOD FOR AN ACCESS SYSTEM, COMPUTER PROGRAM PRODUCT, AND COMPUTER-READABLE MEDIUM

This nonprovisional application is a continuation of International Application No. PCT/EP2019/076178, which was filed on Sep. 27, 2019 and which claims priority to German Patent Application No. 10 2018 124 354.5, which was filed in Germany on Oct. 2, 2018 and which are both herein incorporated by reference.

BACKGROUND OF THE INVENTION

Field of the Invention

The present invention relates to an access system for a vehicle, a method for an access system, a computer program product, and a computer-readable medium.

Description of the Background Art

Access systems for vehicles, methods, computer program products, and computer-readable media are already known in numerous design versions from the prior art.

In addition, a method to defend against relay attacks is known from US 2016/0140539 A1, for example, in which a sequence of motions of a mobile device is captured and analyzed via two motion sensors. The sequence of motions of the mobile device is detected on the one hand via the mobile device itself, and on the other hand by a motion sensor separate from the mobile device. If the sequence of motions of the mobile device captured by the mobile device and by the separate motion sensor substantially match one another, the conclusion is drawn that no relay attack is present. The method known from US 2016/0140539 A1 is intended to be used with payment systems or the like. The customer of such a payment system is prompted to carry out a specific motion with the mobile device, which is then captured and analyzed via the two motion sensors in the above manner.

SUMMARY OF THE INVENTION

It is therefore an object of the present invention to is to improve security for access to a vehicle An important advantage of the invention is, in particular, that security for access to a vehicle, for example a motor vehicle such as an automobile or the like, is improved. With the sensing and analysis of a single sequence of motions of a person moving outside the vehicle and carrying the portable motion sensor, on the one hand by this portable motion sensor and on the other hand by a vehicle-mounted motion sensor, the security in an access system for a vehicle is improved significantly. The phrase "single sequence of motions" means that the same sequence of motions of the person can be sensed via the at least one vehicle-mounted motion sensor and the at least one portable motion sensor. If the sensed sequences of motions match substantially, then it is the same person. Otherwise, there are different persons moving in the environment of the vehicle.

In the invention, in contrast to US 2016/0140539 A1, which is in a different class, it is not the sequence of motions of the mobile device, which is to say of the portable motion sensor, that is sensed and compared, but instead the sequence of motions of the person bearing the portable motion sensor, or in other words carrying it. As a result, on the one hand the sensing of the sequence of motions is simplified and a variety of different, suitable types of motion sensors can be used according to the invention, especially with regard to the vehicle-mounted motion sensor. For example, it is easier in this way to use a sensor that is already installed on the vehicle for other purposes as the vehicle-mounted motion sensor. On the other hand, the security of the access system is also improved in that it is specifically not the sequence of motions of a mobile device that is sensed and analyzed, but instead the sequence of motions of the person whose access authorization is ultimately at stake. In addition to an automatic unlocking of the at least one door of the vehicle, it is also possible that an automatic locking of the at least one door of the vehicle takes place. For example, this can be the case when it is automatically recognized via the sequence of motions of the person that the person is exiting the vehicle or is moving away from the vehicle.

The term "vehicle" should be understood generally, and includes all types of land, water, and air vehicles. The term "access control unit" should also be interpreted broadly, and includes not only access control units via which at least one door of the vehicle can be automatically locked or automatically unlocked, but also access control units that additionally control starting of the vehicle. For example, the starting of the vehicle can be controlled as a function of additional conditions. The term "door" includes all types of doors, hatches, hoods, and covers of the vehicle.

An advantageous improvement of the access system according to the invention provides that the vehicle-mounted motion sensor and the portable motion sensor are designed and configured in such a manner that the vehicle-mounted motion sensor and the portable motion sensor sense the sequence of motions of the person independently of one another. As a result, security for access to the vehicle is further improved.

Accordingly, an advantageous improvement of the method according to the invention provides that the vehicle-mounted motion sensor and the portable motion sensor sense the sequence of motions of the person independently of one another.

Another advantageous improvement of the access system according to the invention provides that the vehicle-mounted motion sensor and the portable motion sensor are designed and configured in such a manner that the sensing of the sequence of motions of the person via the vehicle-mounted motion sensor takes place as a function of a previous identification of this person via the portable motion sensor. It is ensured in this way that the sequence of motions sensed by the vehicle-mounted motion sensor and the sequence of motions sensed by the portable motion sensor relate to the sequence of motions of the same person.

Accordingly, an advantageous improvement of the method according to the invention provides that the sensing of the sequence of motions of the person via the vehicle-mounted motion sensor takes place as a function of a previous identification of this person via the portable motion sensor.

Fundamentally, the at least one vehicle-mounted motion sensor can be freely selected within broad suitable limits in terms of type, mode of operation, dimensioning, material, arrangement, and number. Advantageously, the at least one vehicle-mounted motion sensor is implemented as a camera, a radar, a lidar, and/or a TOF sensor. The camera can be, for example, an optical camera that operates in the wavelength range of visible light. The abbreviation "TOF" stands for "time of flight," and means a transit-time measurement of a signal transmitted by a sensor that is reflected at an object and returns to the sensor. It is also possible that the at least one vehicle-mounted motion sensor can also be used for other vehicle functions, such as, e.g., a parking assist system, emergency braking assist system, or the like. For example, multiple vehicle-mounted sensors that differ from one another with regard to their mode of operation can also be used in combination with one another as vehicle-mounted motion sensors. It would also be possible that, for example, a multiplicity of vehicle-mounted sensors are used to observe individual sections of an environment of the vehicle for the purpose of complete observation of this environment.

The at least one portable motion sensor also can be freely selected within broad suitable limits in terms of type, mode of operation, dimensioning, material, arrangement, and number. One advantageous improvement of the access system according to the invention provides that the at least one portable motion sensor is implemented as a UID, a smartphone, a wearable device, a three-axis magnetometer, a three-axis accelerometer, and/or a three-axis gyroscope. As a result, the portable motion sensor can be realized in an especially simple way. The abbreviation "UID" stands for "user identification device," and means a device for identifying a user, for example a transponder key. Furthermore, it is possible to use the portable motion sensor for other purposes, as well. The at least one portable motion sensor consequently has at least a single one of the aforementioned implementations, or an arbitrary number and combination of these implementations.

An especially advantageous improvement of the access system according to the invention provides that at least one of the at least one vehicle-mounted motion sensor and/or of the at least one portable motion sensor is/are designed and configured to detect at least one physical characteristic of the person, and that the access control unit can be actuated by the controller as a function of the detected physical characteristic in such a manner that the access control unit locks or unlocks the at least one door. In this way, the security of the access to the vehicle is improved still more. For example, it is possible that the height of the person carrying the portable motion sensor can be captured and analyzed via the vehicle-mounted motion sensor. In another embodiment, an analysis of the sequence of motions of the person carrying the portable motion sensor could take place alternatively or in addition thereto in order to thus be able to identify a specific person or a specific group of people, for example on the basis of a gait pattern of a person. Accordingly, an unwanted access to the vehicle, which is to say an unwanted unlocking of the at least one door of the vehicle, for example by a young child or an animal, could be prevented effectively. Via the analysis of the sequence of motions of the person carrying the portable motion sensor, a person under the influence of alcohol could also be denied access to the vehicle, for example.

Accordingly, an advantageous improvement of the method according to the invention provides that at least one of the at least one vehicle-mounted motion sensor and/or the at least one portable motion sensor is/are designed and configured to detect at least one physical characteristic of the person, and that the controller actuates the access control unit as a function of the detected physical characteristic in such a manner that the access control unit locks or unlocks the at least one door.

An especially advantageous improvement of the method according to the invention provides that the comparison is triggered in the controller as a function of the substantial simultaneity of the sensing of a sequence of motions of the person via the vehicle-mounted motion sensor and the portable motion sensor. It is ensured by this means that the comparison, and thus a correlated automatic locking or unlocking of the at least one door of the vehicle only takes place when the same sequence of motions of the person is sensed by the vehicle-mounted motion sensor on the one hand and by the portable motion sensor on the other hand. The phrase "substantial simultaneity" means that a simultaneity within certain tolerances defined in advance should also be understood as simultaneity according the invention.

Another advantageous improvement of the method according to the invention provides that a position of the portable motion sensor relative to the person is detected via the portable motion sensor, wherein this position of the portable motion sensor is analyzed for sensing of the sequence of motions of the person via the portable motion sensor and/or via the vehicle-mounted motion sensor. This makes it possible to improve the quality of the sensing of the sequence of motions of the person via the portable motion sensor and/or via the vehicle-mounted motion sensor without additional sensors. For example, it is possible that a vehicle-mounted motion sensor implemented as a camera captures, in particular, an area in which the portable motion sensor is positioned on the person for the purpose of capturing the sequence of motions of the person. It is possible, for example, that the images captured in this area are supplied to a more extensive, which is to say a more detailed, analysis. The position of the portable motion sensor relative to the person always relates in this context to the motion sensor carried by this person.

Fundamentally, the detection of the position of the portable motion sensor relative to the person can be freely selected within broad suitable limits in terms of type and mode of operation. An advantageous improvement of the aforementioned embodiment of the method according to the invention provides that the position of the portable motion sensor relative to the person is detected via a determination of one step duration in each case of the person along all three spatial axes, wherein the z-axis is substantially parallel to a vertical axis of the person, and the x-axis and the y-axis are perpendicular to one another and to the vertical axis of the person. As a result, the quality of the detection of the position of the portable motion sensor relative to the person is further improved in a simple manner. Step duration can mean the length of time of a step performed by the person carrying the portable motion sensor, or in other words the length of time between one of this person's feet being lifted from the ground and this person's same foot being set back down on the ground. The step duration can be determined through, e.g., integration of the acceleration values measured on the corresponding spatial axis, which is to say the x-axis, the y-axis, or the z-axis, via a portable motion sensor implemented as an accelerometer.

An advantageous improvement of the last-mentioned embodiment of the method according to the invention provides that the position of the portable motion sensor relative to the person is identified as a coat pocket or a shirt pocket or a hand of the person in the case of a step duration of the person along the z-axis of n and at the same time a step duration of the person along the x-axis or the y-axis of approximately $0.5*n$. In this way, a detection of the position of the portable motion sensor in the coat pocket, the shirt pocket, or the hand of the person is made possible in a simple manner.

Similar applies for another advantageous improvement of the method according to the invention in accordance with claim 13, according to which the position of the portable motion sensor relative to the person is identified as a container carried in the hand of the person or as a hand of the person in the case of a step duration of the person along the z-axis of n and at the same time a step duration of the person along the x-axis or the y-axis of approximately zero. The container can be implemented as, for example, a briefcase, a shopping bag, a women's handbag, or the like.

This likewise applies in similar fashion for another advantageous improvement of the method according to the invention in accordance with claim 13, according to which the position of the portable motion sensor relative to the person is identified as a trouser pocket or a skirt pocket of the person in the case of a step duration of the person along the z-axis of n and at the same time a step duration of the person along the x-axis or the y-axis of approximately n.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE shows an exemplary embodiment of an access system according to the invention for a vehicle.

DETAILED DESCRIPTION

In the FIGURE, an exemplary embodiment of an access system according to the invention for a vehicle 2 is shown by way of example. The vehicle 2 is implemented as an automobile. The access system comprises a vehicle-mounted motion sensor 4 implemented as an optical camera, wherein the optical camera 4 operates in the wavelength range of visible light. The camera 4 is arranged on the vehicle 2, and is connected in a signal-transmitting manner to a controller 6 of the vehicle 2 in a manner known to the person skilled in the art. For example, the signal-transmitting connection can be wired or wireless. The controller 6 is additionally connected to an access control unit 8 of the vehicle 2 in a signal-transmitting manner and is designed and configured to actuate the access control unit 8 in such a manner that the access control unit 8 automatically locks or unlocks all doors 10 of the vehicle 2. The doors 10 are implemented here as a driver-side door, a passenger-side door, two rear doors, and a rear hatch.

Furthermore, the access system has a portable motion sensor 12, which is implemented as a three-axis accelerometer of a smartphone in the present exemplary embodiment. The smartphone, and thus the three-axis accelerometer 12 of the smartphone, has a signal-transmitting connection to the controller 6 of the vehicle 2 in a manner known to the person skilled in the art, for example a wireless connection.

The mode of operation of the access system according to the invention and the method according to the invention in the present exemplary embodiment are explained in detail below on the basis of the FIGURE.

A person 14 is carrying the portable motion sensor 12, which is to say the smartphone, in his coat pocket and is moving toward the vehicle 2. The portable motion sensor 12, namely the three-axis accelerometer of the smartphone, senses the sequence of motions as the person 14 moves toward the vehicle 2. At the same time, the same sequence of motions of the person 14 is sensed via the vehicle-mounted motion sensor 4, namely the camera of the vehicle 2. For example, provision can be made that the portable motion sensor 12 activates the vehicle-mounted motion sensor 4 as it approaches the vehicle 2. The vehicle-mounted motion sensor 4 and the portable motion sensor 12 are designed and configured in the present exemplary embodiment in such a manner that the vehicle-mounted motion sensor 4 and the portable motion sensor 12 sense the sequence of motions of the person 14 independently of one another.

On account of the simultaneous sensing of the sequence of motions of the person 14 as he approaches the vehicle 2 via the vehicle-mounted motion sensor 4 and the portable motion sensor 12, the comparison of the sequence of motions of the person 14 sensed by the portable motion sensor 12 with the sequence of motions of the person 14 sensed by the vehicle-mounted motion sensor 4 is triggered, which is to say started, automatically. Since the sequence of motions of the person 14 sensed via the portable motion sensor 12 substantially matches the sequence of motions of the person 14 sensed via the vehicle-mounted motion sensor 4 as he approaches the vehicle 2, the access control unit 8 of the vehicle 2 is actuated by the controller 6 in such a manner that the access control unit 8 automatically unlocks the doors 10 of the vehicle 2 in a manner known to the person skilled in the art. It is fundamentally also possible, however, that the access to the vehicle 2, and thus the unlocking of the doors 10 of the vehicle 2, is dependent on additional conditions. For example, it is possible that the access conditions according to the invention are combined with additional access conditions known from the prior art. This can be achieved in an especially simple way by implementing the portable motion sensor as a UID, which is to say as a user identification device, for example a transponder key.

The analysis of the two sequences of motions in the controller 6 takes place here in a manner known to the person skilled in the art. Accordingly, the two sequences of motions in the controller 6 are synchronized in time and transferred to a common coordinate system.

If the sequence of motions of the person 14 sensed via the portable motion sensor 12 had not matched the sequence of motions of the person 14 sensed via the vehicle-mounted motion sensor 4 as he approaches the vehicle 2 within a tolerance range defined in advance and stored in the controller 6, then the controller 6 would not have actuated the access control unit 8 of the vehicle 2 in the abovementioned manner.

The person 14 enters the vehicle 2 and drives away. For example, provision can be made for this purpose that the person 14 need only press a pushbutton or the like to start up the vehicle 2. Alternatively, a different embodiment of the invention can provide that startup of the vehicle is made possible as a function of, for example, the analysis of output signals from a passenger compartment camera or the like in order to realize additional security against unauthorized startup.

When the person 14 leaves the vehicle 2 again, the portable motion sensor 12, namely the three-axis accelerometer of the smartphone, senses the sequence of motions during the movement of the person 14 when exiting the vehicle 2 and/or when closing the door 10 of the vehicle 2 and/or when moving away from the vehicle 2. At the same time, the same sequence of motions of the person 14 is sensed via the vehicle-mounted motion sensor 4, namely the camera of the vehicle 2. On account of the simultaneous sensing of the sequence of motions of the person 14 when exiting the vehicle 2 and/or when closing the door 10 of the vehicle 2 and/or when moving away from the vehicle 2 via the vehicle-mounted motion sensor 4 and the portable motion sensor 12, the comparison of the sequence of motions of the person 14 sensed by the portable motion sensor 12 with the sequence of motions of the person 14 sensed by the vehicle-mounted motion sensor 4 is again triggered, which is to say started, automatically. Since the sequence of motions of the person 14 sensed via the portable motion sensor 12 substantially matches the sequence of motions of the person 14 sensed via the vehicle-mounted motion sensor 4 when exiting the vehicle 2 and/or when closing the door 10 of the vehicle 2 and/or when moving away from the vehicle 2, the access control unit 8 of the vehicle 2 is actuated by the controller 6 in such a manner that the access control unit 8 automatically locks the doors 10 of the vehicle 2 in a manner known to the person skilled in the art.

In addition, the invention relates to a computer program product, comprising commands that cause the access system according to the invention in accordance with the present exemplary embodiment to execute the steps of the method according to the invention in accordance with the present exemplary embodiment, as well as a computer-readable medium, on which the computer program product is stored.

The invention is not limited to the present exemplary embodiment. For example, the invention can be used to good advantage in a multitude of different vehicles, for example land, water, and air vehicles. Furthermore, the at least one portable motion sensor and the at least one vehicle-mounted motion sensor can be freely selected within broad suitable limits. For example, the at least one vehicle-mounted motion sensor can be implemented as a different type of camera, a radar, a lidar, and/or a TOF sensor. Combinations of the aforementioned motion sensors are also possible. Similar applies for the at least one portable motion sensor, which can also be implemented, for example, as a UID, a wearable device, and/or a three-axis magnetometer, a three-axis accelerometer, and/or a three-axis gyroscope as such. The relevant motion sensors are not limited to accelerometers here.

In another example of the access system according to the invention, the at least one vehicle-mounted motion sensor and the at least one portable motion sensor can be designed and configured in such a manner that the sensing of the sequence of motions of the person via the at least one vehicle-mounted motion sensor takes place as a function of a previous identification of this person via the at least one portable motion sensor. It is ensured in this way that the sequence of motions of the person sensed by the at least one vehicle-mounted motion sensor and the sequence of motions of the person sensed by the at least one portable motion sensor relate to the sequence of motions of the same person. Accordingly, a different embodiment of the method according to the invention provides that the sensing of the sequence of motions of the person via the at least one vehicle-mounted motion sensor takes place as a function of a previous identification of this person via the at least one portable motion sensor.

It is also possible that at least one of the at least one vehicle-mounted motion sensor and/or the at least one portable motion sensor is/are designed and configured to detect at least one physical characteristic of the person, and that the access control unit can be actuated by the controller as a function of the detected physical characteristic in such a manner that the access control unit locks or unlocks the at least one door. For example, it is possible that the height of the person carrying the at least one portable motion sensor can be captured and analyzed via the at least one vehicle-mounted motion sensor. In another embodiment, an analysis of the sequence of motions of the person carrying the portable motion sensor could take place alternatively or in addition thereto in order to thus be able to identify a specific person or a specific group of people, for example on the basis of a gait pattern of a person. Accordingly, an unwanted access to the vehicle, which is to say an unwanted unlocking of the at least one door of the vehicle, for example by a young child or an animal, could be prevented effectively. Via the analysis of the sequence of motions of the person carrying the portable motion sensor, a person under the influence of alcohol could also be refused access to the vehicle, for example. Alternatively or in addition thereto, the detection of at least one physical characteristic of the person via the at least one portable motion sensor is possible. The signal-transmitting connection of the at least one portable motion sensor and/or of the at least one vehicle-mounted motion sensor can be additionally protected via an encryption or the like.

Furthermore, it is possible that a position of the portable motion sensor relative to the person is detected via the portable motion sensor, wherein this position of the portable motion sensor is analyzed for sensing of the sequence of motions of the person via the portable motion sensor and/or via the vehicle-mounted motion sensor. This makes it possible to improve the quality of the sensing of the sequence of motions of the person via the portable motion sensor and/or via the vehicle-mounted motion sensor without additional sensors. For example, it is possible that a vehicle-mounted motion sensor implemented as a camera captures, in particular, an area in which the portable motion sensor is positioned on the person for the purpose of capturing the sequence of motions of the person. It is possible, for example, that the images captured in this area are supplied to a more extensive, which is to say a more detailed, analysis. Fundamentally, in this case the detection of the position of the portable motion sensor relative to the person can be freely selected within broad suitable limits in terms of type and mode of operation. For example, it is possible that the position of the portable motion sensor relative to the person is detected via a determination of one step duration in each case of the person along all three spatial axes, wherein the z-axis is substantially parallel to a vertical axis of the person, and the x-axis and the y-axis are perpendicular to one another and to the vertical axis of the person. As a result, the quality of the detection of the position of the portable motion sensor relative to the person is further improved in a simple manner.

One advantageous improvement of the last-mentioned embodiment provides that the position of the portable motion sensor relative to the person is identified as a coat pocket or a shirt pocket or a hand of the person in the case of a step duration of the person along the z-axis of n and at the same time a step duration of the person along the x-axis or the y-axis of approximately $0.5*n$. In this way, a detection of the position of the portable motion sensor in the coat pocket, the shirt pocket, or the hand of the person is made possible in a simple manner.

Similar applies for another advantageous improvement of the method according to the invention in accordance with claim 13, according to which the position of the portable motion sensor relative to the person is identified as a container carried in the hand of the person or as a hand of the person in the case of a step duration of the person along the z-axis of n and at the same time a step duration of the person along the x-axis or the y-axis of approximately zero.

This likewise applies in similar fashion for another advantageous improvement of the method according to the invention in accordance with claim 13, according to which the position of the portable motion sensor relative to the person is identified as a trouser pocket or a skirt pocket of the person in the case of a step duration of the person along the z-axis of n and at the same time a step duration of the person along the x-axis or the y-axis of approximately n.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An access system for a vehicle, the system comprising:
   at least one vehicle-mounted motion sensor;
   at least one portable motion sensor adapted to be carried by a person, the at least one vehicle-mounted motion sensor and the at least one portable motion sensor each sensing a same sequence of motions of the person moving outside of the vehicle and carrying the at least one portable motion sensor;
   an access control unit of the vehicle to lock and/or unlock at least one door of the vehicle; and
   a controller to compare the sequence of motions of the person sensed via the vehicle-mounted motion sensor with the sequence of motions of the person sensed via the at least one portable motion sensor,
   wherein the access control unit is actuated by the controller as a function of the comparison of the sequence of motions of the person sensed via the vehicle-mounted motion sensor and the sequence of motions of the person sensed via the at least one portable motion sensor, such that the access control unit automatically locks or automatically unlocks the at least one door, and
   wherein the at least one vehicle-mounted motion sensor and the at least one portable motion sensor are designed and configured such that the sensing of the sequence of motions of the person via the at least one vehicle-mounted motion sensor takes place as a function of a previous identification of this person via the at least one portable motion sensor.

2. The access system according to claim 1, wherein the at least one vehicle-mounted motion sensor and the at least one portable motion sensor are designed and configured such that the at least one vehicle-mounted motion sensor and the at least one portable motion sensor sense the sequence of motions of the person independently of one another.

3. The access system according to claim 1, wherein the at least one vehicle-mounted motion sensor is implemented as a camera, a radar, a lidar, and/or a TOF sensor.

4. The access system according to claim 1, wherein the at least one portable motion sensor is implemented as a UID, a smartphone, a wearable device, a three-axis magnetometer, a three-axis accelerometer, and/or a three-axis gyroscope.

5. The access system according to claim 1, wherein at least one of the at least one vehicle-mounted motion sensor or the at least one portable motion sensor is/are designed and configured to additionally detect at least one physical characteristic of the person, and in that the access control unit is actuated by the controller as a function of the additionally detected at least one physical characteristic so that the access control unit locks or unlocks the at least one door.

6. The access system according to claim 1, wherein the detection of the position of the at least one portable motion sensor relative to the person determines an area on the person in which the at least one portable motion sensor is positioned.

7. The access system according to claim 1, wherein a position of the at least one portable motion sensor relative to the person is detected via the at least one portable motion sensor, wherein this position of the at least one portable motion sensor is analyzed for sensing of the sequence of motions of the person via the at least one portable motion sensor and/or via the at least one vehicle-mounted motion sensor.

8. A method for an access system of a vehicle, the method comprising:
   sensing, via at least one portable motion sensor, a sequence of motions of a person carrying the at least one portable motion sensor who is moving outside of the vehicle;
   sensing the sequence of motions of the person also via at least one vehicle-mounted motion sensor;
   comparing, in a controller, the sequence of motions of the person sensed via the at least one vehicle-mounted motion sensor with the sequence of motions of the person sensed via the at least one portable motion sensor; and
   actuating an access control unit of the vehicle, by the controller, as a function of the comparison such that the access control unit automatically locks or automatically unlocks at least one door of the vehicle,
   wherein the sensing of the sequence of motions of the person via the at least one vehicle-mounted motion sensor takes place as a function of a previous identification of this person via the at least one portable motion sensor.

9. The method according to claim 8, wherein the comparison is triggered in the controller as a function of the substantial simultaneity of the sensing of the sequence of motions of the person via the at least one vehicle-mounted motion sensor and the at least one portable motion sensor.

10. The method according to claim 8, wherein the at least one vehicle-mounted motion sensor and the at least one portable motion sensor sense the sequence of motions of the person independently of one another.

11. The method according to claim 8, wherein at least one of the at least one vehicle-mounted motion sensor or the at least one portable motion sensor is/are designed and configured to additionally detect at least one physical characteristic of the person, and in that the controller actuates the access control unit as a function of the additionally detected at least one physical characteristic so that the access control unit locks or unlocks the at least one door.

12. The method according to claim 8, wherein a position of the at least one portable motion sensor relative to the person is detected via the at least one portable motion sensor, wherein this position of the at least one portable motion sensor is analyzed for sensing of the sequence of motions of the person via the at least one portable motion sensor and/or via the at least one vehicle-mounted motion sensor.

13. The method according to claim 12, wherein the position of the at least one portable motion sensor relative to the person is detected via a determination of one step duration in each case of the person along all three spatial axes, wherein the z-axis is substantially parallel to a vertical axis of the person, and the x-axis and the y-axis are perpendicular to one another and to the vertical axis of the person.

14. The method according to claim 13, wherein the position of the at least one portable motion sensor relative to the person is identified as a coat pocket or a shirt pocket or a hand of the person in the case of a step duration of the person along the z-axis of n and at the same time a step duration of the person along the x-axis or the y-axis of approximately 0.5*n.

15. The method according to claim 13, wherein the position of the at least one portable motion sensor relative to the person is identified as a container carried in a hand of the person or as the hand of the person in the case of a step duration of the person along the z-axis of n and at the same time a step duration of the person along the x-axis or the y-axis of approximately zero.

16. The method according to claim 13, wherein the position of the at least one portable motion sensor relative to the person is identified as a trouser pocket or a skirt pocket of the person in the case of a step duration of the person along the z-axis of n and at the same time a step duration of the person along the x-axis or the y-axis of approximately n.

17. A non-transitory computer-readable medium storing a computer program thereon that, when executed by a computer, causes the computer to execute the steps of the method according to claim 8.

18. The method according to claim 8, wherein the detection of the position of the at least one portable motion sensor relative to the person determines an area on the person in which the at least one portable motion sensor is positioned.

* * * * *